O. L. DURST.
BED SPRING.
APPLICATION FILED SEPT. 5, 1911. RENEWED JULY 26, 1913.
1,131,346.
Patented Mar. 9, 1915.
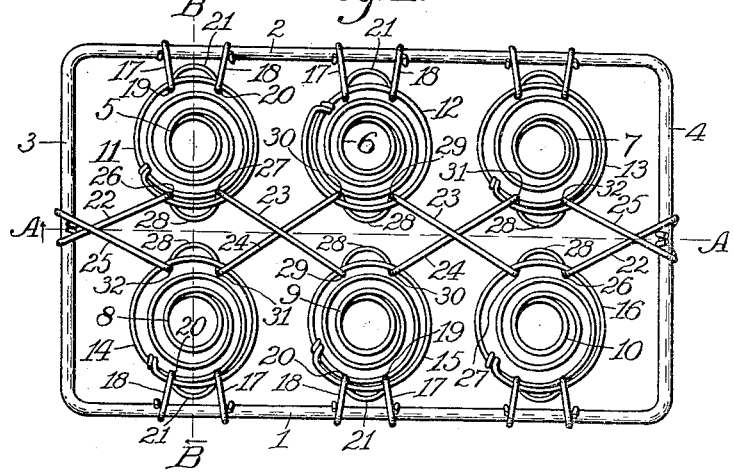
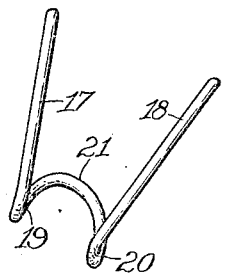
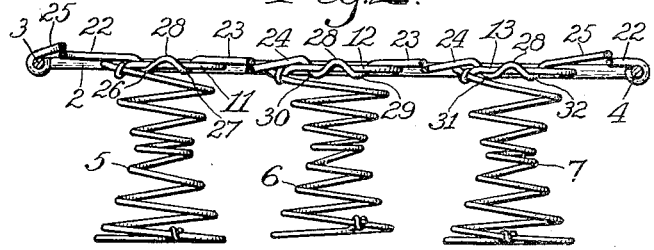
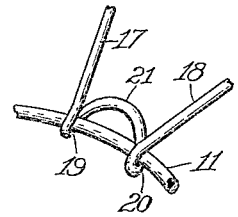
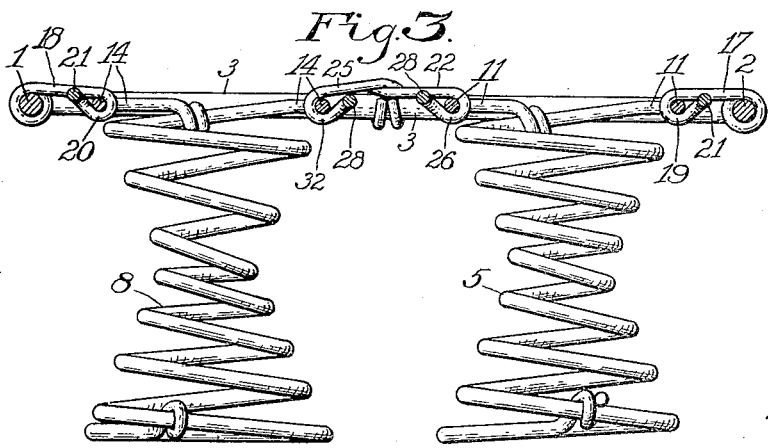
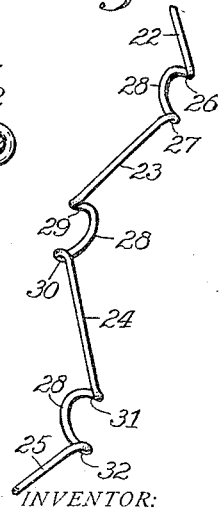
WITNESSES:
J. H. Gardner.
M. L. Wilhelm.
INVENTOR:
Ora L. Durst,
BY
E. T. Silvius,
ATTORNEY.

UNITED STATES PATENT OFFICE.

ORA L. DURST, OF INDIANAPOLIS, INDIANA.

BED-SPRING.

1,131,346. Specification of Letters Patent. Patented Mar. 9, 1915.

Application filed September 5, 1911, Serial No. 647,765. Renewed July 26, 1913. Serial No. 781,452.

*To all whom it may concern:*

Be it known that I, ORA L. DURST, a citizen of the United States, residing at Indianapolis, in the county of Marion and State of Indiana, have invented a new and useful Bed-Spring, of which the following is a specification, reference being had to the accompanying drawings, and. to the letters and figures of reference marked thereon.

This invention relates to groups of helical or coil springs and frames therefor of the type that is adapted to form the spring-structure for use in beds, couches or seats, the invention having reference more particularly to devices for connecting the springs to their frames.

The object of the invention is to provide improved tie-wires for connecting springs of the above mentioned character together and to their frames; a particular object being to provide tie-wires of novel form that may be cheaply produced and be rapidly connected with the springs and the frame and also permit the greatest freedom of movement of the springs.

A still further object is to provide improved tie-wires that shall be so connected with the springs as to permit one or more of the springs to be quickly removed and replaced by new springs in case any of the original springs become weakened or broken; an underlying aim being to provide a durable, relatively inexpensive and economical spring-structure for beds and the like.

The invention consists in novel forms of tie-wires bent to form rod portions, each rod portion having one or more hooks formed thereon, the ends of each two adjacent hooks being connected together by a bow-shaped loop, so as to form a clasp, the invention consisting also in means for connecting the springs of parallel rows of springs together in such manner as to avoid direct connections between two adjacent springs, so that the ends of the springs may move slightly each toward or from the other and therefore insure the highest degree of latitude of cushion movement. The invention consists further in the novel parts and in the combinations and arrangements of parts as hereinafter particularly described and claimed.

Referring to the drawings, Figure 1 is a plan of a set of springs illustrating the invention; Fig. 2, a central sectional elevation on the line A A in Fig. 1; Fig. 3, a sectional elevation on the line B B in Fig. 1; Fig. 4, a perspective view of one of the improved devices for connecting the spring to its frame; Fig. 5, a fragmentary perspective view of the device shown in the preceding figure and connected with the end ring of a spring; and Fig. 6, a fragmentary perspective view of the main tie-wire which is reversible in plan for connecting the springs together and to the frame.

Similar reference characters in the different figures of the drawings indicate corresponding elements or features of construction herein referred to.

Each group or set of springs for a bed, cushion or the like, includes one or more frames to which the springs are connected for holding the springs together and maintaining them in rows or series at suitable distances apart. As fully illustrating the purpose and mode of operation of the invention one frame only is illustrated and it preferably is composed of wire and comprises two parallel side bars 1 and 2 and two parallel end bars 3 and 4, all formed integrally. The frame is of suitable size to accommodate the desired number of springs, in the present case six springs 5, 6, 7, 8, 9 and 10 being illustrated, the springs being all substantially alike and of the coiled or helical type, the end coils being formed into rings 11, 12, 13, 14, 15 and 16 respectively as is customary. The springs as shown are arranged in parallel rows both longitudinally and transversely.

A novel form of short tie comprises a wire bent to form two rod portions 17 and 18 provided at one end with hooks 19 and 20 respectively whereby the ring of a spring is connected to the frame by suitably securing the opposite ends of the rod portions to the frame, said portions extending over the outer side of the ring and the hooks embracing the ring, the ends of the hooks extending from the inner side of the ring and are integrally connected with a bow-shaped loop 21 that extends upward at its middle portion approximately to the plane of the two rod portions, so as to be opposite the outer side of the ring of the spring, in order to clasp and prevent the ring from becoming accidentally disconnected from the hooks. The device is composed of a single piece of stiff wire, preferably of steel so as to retain its shape, and preferably the two portions 17 and 18 diverge from the ring, 11, to the adjacent bar of the frame. One of the devices only is required for detachably connecting each ring to the frame and preferably the devices are connected to the side or longer bars of the frame.

The improved main tie-wire is composed of a single piece of wire of suitable length to extend from one bar to the opposite bar of the frame preferably in zig-zag arrangement and detachably connect springs of two adjacent rows together. Each tie-wire is so bent as to form a suitable number of connecting rod portions, as 22, 23, 24 and 25, each alternate portion extending preferably at an obtuse angle to the next adjacent portion. As serving to explain the mode of application of the tie-wire, the rod portion 22 is connected at one end to the bar 3 of the frame and its opposite end has a hook 26 formed thereon that embraces the ring 11; the portion 23 has a hook 27 on one end that also embraces the ring 11 and extends to the ring 15 of the spring 9 in the adjacent row. The ends of each two hooks that are connected to one spring ring are integrally connected to a bow-shaped loop 28 that extends around opposite the outer side of the ring and forms a clasp which prevents the ring from becoming accidentally disconnected from the hooks. The opposite end of the portion 23 has a hook 29 thereon that embraces the ring 15 and is connected with a loop 28 which is connected also with a hook 30 formed on one end of the portion 24 and also embraces the ring 15. The portion 24 extends from the ring 15 to the ring 13 of the spring 7 in the adjacent row of springs and has a hook 31 formed thereon that embraces the ring 13, the end of the hook being integrally connected with a loop 28 which is connected with the end of a hook 32 that is formed on one end of the portion 25 and embraces the ring 13, the opposite end of the portion 25 being secured to the frame bar 4. As will be seen more clearly in Fig. 1 the main tie-wire is applied also in reverse order, and is connected in like manner to the frame and to the remaining alternate springs of the adjacent rows, as will be readily understood. The middle portions of the loops 28 extend to the plane of the rods. It should be understood however that when the two longitudinal rows of springs are relatively farther apart than indicated the rod portions 22 and 25 may not cross but may converge from the springs to the frame bar. It will be understood that the length of the main tie-wire may be extended to form the alternately angled rod portions to any desired or required length.

In practical use when pressure is exerted upon the springs each spring can yield independently without straining or bending the tie-wires, the tie-wires permitting slight lateral movement of the end rings of the springs, so that the desired results are fully attained.

Having thus described the invention, what is claimed as new is—

1. A spring structure comprising a frame, a group of coil springs arranged in the frame in parallel rows, a plurality of main tie-wires permanently connected to substantially opposite portions of the frame and each detachably connected at two separate points with alternate springs of two adjacent rows, and devices detachably connecting marginal springs of the group to the frame.

2. In a spring structure, the combination with a rectangular frame, and a plurality of springs arranged in parallel rows in the frame, there being a ring formed on each spring, of a plurality of tie devices connected to two opposite portions of the frame opposite the rings of the springs in the two outermost rows, each device comprising two rod portions extending from the frame convergently to an adjacent ring, each rod portion having a hook removably connected to the ring, and a loop connected to the ends of the hooks, the middle portion of the loop extending between the rod portions and to the plane of the rod portions, all portions of each device being formed integrally; and a plurality of main tie-wires comprising each a plurality of rod portions having hooks thereon loosely embracing the rings, the ends of each two hooks that embrace one ring having a bow-shaped loop connected thereto, the middle portion of the loop extending over to the plane of the rod portions, the end portions of the main tie-wires being connected to other two opposite portions of the frame.

3. In a spring structure, the combination of a rectangular frame, a group of coil springs arranged in the frame, a plurality of main tie-wires comprising each a plurality of rod portions having hooks thereon loosely embracing the springs, one coil of each spring being embraced by one of the hooks of two adjacent rod portions, the ends of the two hooks that embrace one coil having a bow-shaped loop connected thereto, the middle portion of the loop extending over to the plane of the rod portions, the end portions of the tie-wires being connected to two opposite portions of the frame, and wire devices connecting coils of the springs to other two opposite portions of the frame.

4. In a spring structure, the combination of a rectangular frame, a plurality of coil springs arranged in the frame, a plurality of main tie-wires permanently connected to substantially opposite portions of the frame and each detachably connected at two separate points with coils of the springs, and a plurality of tie devices connected to the other two opposite portions of the frame opposite to coils of the springs adjacent thereto, each device comprising two rod portions extending from the frame convergently to an adjacent coil, each rod portion having a hook removably connected to the coil, and a loop connected to the ends of the hooks, the middle portion of the loop extending between the rod portions and to the plane of the rod portions, all portions of each device being formed integrally.

In testimony whereof, I affix my signature in presence of two witnesses.

ORA L. DURST.

Witnesses:
E. T. SILVIUS,
EDWIN M. S. STEERS.